Patented Jan. 14, 1930

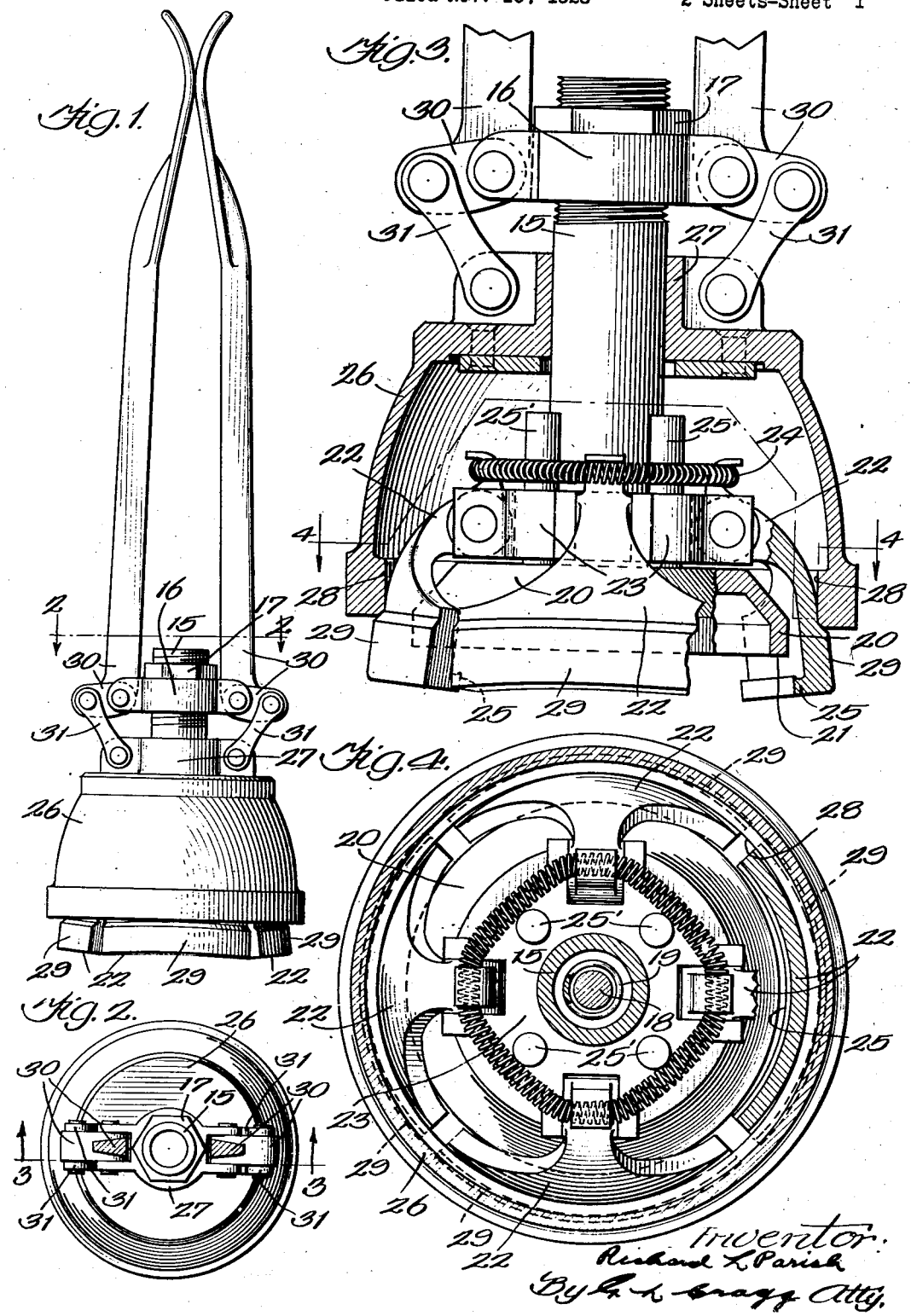

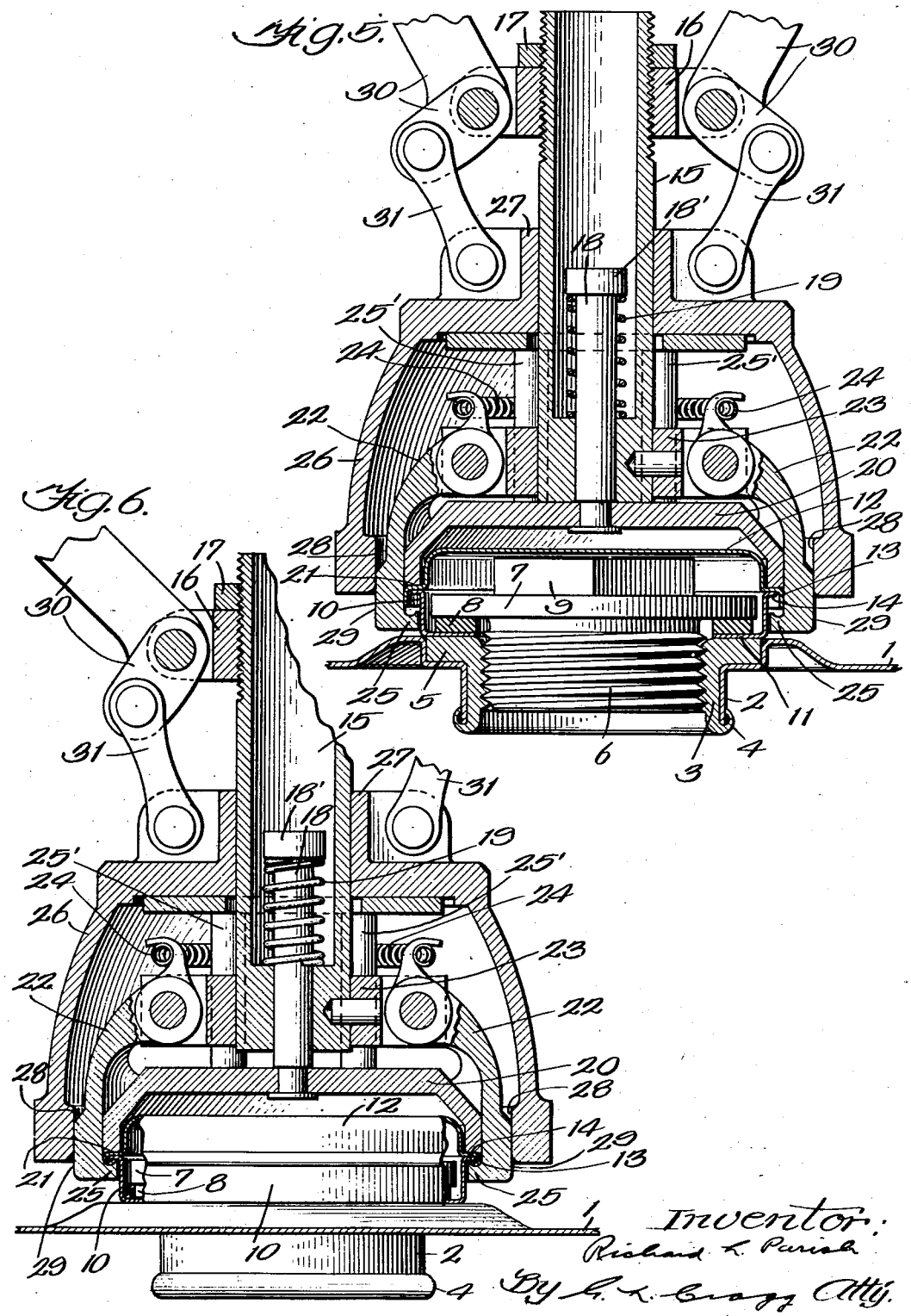

1,743,475

UNITED STATES PATENT OFFICE

RICHARD L. PARISH, OF CHICAGO, ILLINOIS, ASSIGNOR TO AMERICAN FLANGE & MANUFACTURING COMPANY, OF CHICAGO, ILLINOIS, A CORPORATION OF ILLINOIS

CRIMPING TOOL

Application filed November 16, 1928. Serial No. 319,913.

My invention relates to crimping tools, the tool of my invention being of particular service in joining the body and cap portions of such seals as are designed in Patent No. 1,633,555, issued June 24, 1927 to Francis R. Burgess. The tool of my invention includes a clamping jaw having an annular work engaging face which is normal to its own axis, a set of pivoted clamping jaws enclosing the first aforesaid clamping jaw and having inwardly projecting arcuate ledges having arcuate work engaging faces which may be brought into and out of lapping relation with the aforesaid annular work engaging face upon suitable swinging movement of the pivoted jaws, an actuating member surrounding the set of pivoted jaws, said actuating member and set of pivoted jaws and said set of pivoted jaws and the first aforesaid jaw being relatively movable along the axis of the aforesaid annular work engaging face, said actuating member and pivoted jaws having portions adapted for wedging engagement upon relative movement of said actuating member and pivoted jaws in one direction and formed to then cooperate to move the ledges of the pivoted jaws into lapping relation with the annular work engaging face of the first jaw, and mechanism for effecting relative movement of said actuating member and the set of pivoted jaws and relative movement of the first jaw and the set of pivoted jaws along the axis of the aforesaid annular work engaging face.

The invention has other characteristics and will be more fully explained in connection with the accompanying drawings in which Fig. 1 is a side elevation of a tool constructed in accordance with the preferred embodiment of the invention, the tool being shown open; Fig. 2 is a sectional view on line 2—2 of Fig. 1; Fig. 3 is a longitudinally sectional view of the lower portion of a tool, on a larger scale, parts being shown in elevation; Fig. 4 is a sectional view on line 4—4 of Fig. 3; Fig. 5 is a view similar to Fig. 3 but with more parts shown in section, the clamping jaws being also shown, in more closely approached relation, the work to which the tool is applied being also illustrated; and Fig. 6 is a view somewhat similar to Fig. 5 but showing the clamping jaws fully applied to the work.

The form of work illustrated and in conjunction with which the tool of my invention may be employed will be first generally described. Referring to Figs. 5 and 6 I have shown a part of a sheet metal wall 1 of a container such as a metallic barrel. This wall is formed with a depending rim 2 which surrounds a circular hole which is formed through the wall. An interiorly threaded bushing 3 is snugly received within this hole and is closely surrounded by said rim, this bushing being shown with an outwardly curled inner edge portion 4 which grips the inner end of the aforesaid rim. The bushing is also formed with a circumscribing flange 5 which is tightly seated upon the wall 1. A closure plug 6 is screwed within the bushing and is formed with a circumscribing flange 7 which laps the bushing flange 5 and wall 1. A sealing gasket 8 is clamped between the two flanges 5 and 7. The outer end of the plug is formed with a polygonal tool engaging portion 9 at the outer end of the plug. A guard is employed for preventing undetectable removal of the plug. This guard includes a body portion 10 having a flat part 11 which is clamped between the gasket 8 and flange 5. The guard is also inclusive of a cap portion 12 which covers or is in lapping relation with the plug. This cap portion 12 has a skirt portion 13 which surrounds the outer end of the body portion 10 of the guard and initially extends along the axis of the bushing, Fig. 5. The body portion 10 of the guard has an outwardly projecting annular shoulder or flange 14. The tool of my invention is designed to crimp the skirt portion 13 from the shape shown in Fig. 5 to the shape shown in Fig. 6, the tool being employed after the closure plug has been screwed home and the cap 12 has been placed upon the guard portion 10.

The tool illustrated is inclusive of a central tubular stem 15 upon which the hub portion 16 of a spider is screwed, there being a locking washer 17 for holding thus hub portion 16 in fixed relation to said stem. Said spider forms an anchorage for operating mechanism of the tool as will later appear. The lower end of the bore of the stem is contracted to afford a slide bearing for the plunger 18 which is pressed upon in an upward direction by a coil spring 19 that surrounds the plunger and is interposed between the plunger head 18' and the lower end of the central stem. The tool is inclusive of an inverted cup shaped clamping jaw 20 which is rigidly assembled with the lower end of the plunger 18, the spring 19 serving to elevate the jaw 20 after each operation of the tool and permitting the jaw to descend in the operation of the tool. The jaw 20 has an annular work engaging face 21 which is normal to its own axis. A set of clamping jaws 22 encloses the jaw 20, the clamping jaws 22 being each pivoted between its ends upon a spider 23 which is fixed upon the lower end of the stem 15. A coiled spring 24 is passed around the upper ends of the jaws 22, this spring serving to move the lower ends of the jaws outwardly into work clearing position when the tool is being removed from the work. Posts 25' upon and projecting upwardly from the jaw 20 take part in positioning said spring 24. The jaws 22 have inwardly projecting arcuate ledges 25 which have annular work engaging faces that are shaped to suit the joint that is to be formed, Fig. 6, and which may be brought into and out of lapping relation with the annular work engaging face 21 upon suitable swinging movement of the jaws 22. A bell shaped actuating member 26 has its hub portion 27 snugly surrounding and slidable upon the central stem 15. This actuating member surrounds the set of pivoted jaws and has an annular portion 28 which is adapted to have engagement with the wedge portions 29 of the jaws 22. Toggle levers 30 are pivoted at their elbows upon the spider 16 and are connected by means of links 31 with the hub portion 27 of the actuating member 26.

After the container has had the closure plug 6 applied thereto as illustrated in Fig. 5 and after the guard portions 10 and 12 have been arranged as illustrated in this figure the tool is lowered while in open adjustment shown in Fig. 3 which permits the ledge portions 25 of the jaws 22 to pass by the skirt portion 13 of the cap 12. When the tool has been thus positioned the levers 30 are grasped at their upper ends and are there spread apart with the consequence that the actuating member 26 is depressed to bring the anular part 28 thereof into actuating relation with the wedge portions 29 of the jaws 22 with the result that these jaws are inwardly pressed to bring the ledges 25 thereof into lapping relation with the annular work engaging face 21 and the parts 13 and 14 of the plug guard. Continued spreading of the levers brings the top of the actuating member 26 against the posts 25 to force the clamping jaw 20 downwardly along the stem 15 to complete the formation of the joint between the guard parts 10 and 12 as shown in Fig. 6. During the spreading movement of the levers the jaws 22 incidentally engage the jaw 20 the latter jaw serving to limit the extent to which the jaws 22 may be approached, thereby guarding against the collapse of the plug guard. The actuating member 26, the set of jaws 22 and the jaw 20 are relatively moved in the operation of the tool, the actual movement of the jaw 20 being permitted by the spring 19 during the crimping operation, and the jaw 20 being restored by this spring when the jaw is released.

Changes may be made without departing from the invention.

Having thus described my invention, I claim:

1. A crimping tool including a clamping jaw having an annular work engaging face which is normal to its own axis; a set of pivoted clamping jaws enclosing the first aforesaid clamping jaw and having inwardly projecting arcuate ledges having arcuate work engaging faces which may be brought into and out of lapping relation with the aforesaid annular work engaging face upon suitable swinging movement of the pivoted jaws; an actuating member surrounding the set of pivoted jaws, said actuating member and set of pivoted jaws and said set of pivoted jaws and the first aforesaid jaw being relatively movable along the axis of the aforesaid annular work engaging face, said actuating member and pivoted jaws having portions adapted for wedging engagement upon relative movement of said actuating member and pivoted jaws in one direction and formed to then cooperate to move the ledges of the pivoted jaws into lapping relation with the annular work engaging face of the first jaw; mechanism for effecting relative movement of said actuating member and the set of pivoted jaws and relative movement of the first jaw and the set of pivoted jaws along the axis of the aforesaid annular work engaging face; and wherein a spring is employed that presses the jaw having the annular work engaging face into normal position when the actuating member is withdrawn.

2. A crimping tool including a clamping jaw having an annular work engaging face which is normal to its own axis; a set of pivoted clamping jaws enclosing the first aforesaid clamping jaw and having inwardly projecting arcuate ledges having arcuate work engaging faces which may be brought into and out of lapping relation with the aforesaid annular work engaging face upon suitable swinging movement of the pivoted jaws; an actuating member surrounding the set of pivoted jaws, said actuating member and set of pivoted jaws and said set of pivoted jaws and the first aforesaid jaw being relatively movable along the axis of the aforesaid annular work engaging face, said actuating member and pivoted jaws having portions adapted for wedging engagement upon relative movement of said actuating member and pivoted jaws in one direction and formed to then cooperate to move the ledges of the pivoted jaws into lapping relation with the annular work engaging face of the first jaw; mechanism for effecting relative movement of said actuating member and the set of pivoted jaws and relative movement of the first jaw and the set of pivoted jaws along the axis of the aforesaid annular work engaging face; wherein a spring is employed that presses the jaw having the annular work engaging face into normal position when the actuating member is withdrawn; and wherein spring means are applied to the pivoted jaws and operate thereupon, when the actuating member is withdrawn, to bring the ledges upon the pivoted jaws out of lapping relation with the annular work engaging face.

3. A crimping tool including a clamping jaw having an annular work engaging face which is normal to its own axis; a set of pivoted clamping jaws enclosing the first aforesaid clamping jaw and having inwardly projecting arcuate ledges having arcuate work engaging faces which may be brought into and out of lapping relation with the aforesaid annular work engaging face upon suitable swinging movement of the pivoted jaws; an actuating member surrounding the set of pivoted jaws, said actuating member and set of pivoted jaws and said set of pivoted jaws and the first aforesaid jaw being relatively movable along the axis of the aforesaid annular work engaging face, said actuating member and pivoted jaws having portions adapted for wedging engagement upon relative movement of said actuating member and pivoted jaws in one direction and formed to then cooperate to move the ledges of the pivoted jaws into lapping relation with the annular work engaging face of the first jaw; and mechanism for effecting relative movement of said actuating member and the set of pivoted jaws and relative movement of the first jaw and the set of pivoted jaws along the axis of the aforesaid annular work engaging face, wherein there is a central stem extending along the axis of the annular work engaging face and upon and along which all of the clamping jaws and the actuating member are movable.

4. A crimping tool including a clamping jaw having an annular work engaging face which is normal to its own axis; a set of pivoted clamping jaws enclosing the first aforesaid clamping jaw and having inwardly projecting arcuate ledges having arcuate work engaging faces which may be brought into and out of lapping relation with the aforesaid annular work engaging face upon suitable swinging movement of the pivoted jaws; an actuating member surrounding the set of pivoted jaws, said actuating member and set of pivoted jaws and said set of pivoted jaws and the first aforesaid jaw being relatively movable along the axis of the aforesaid annular work engaging face, said actuating member and pivoted jaws having portions adapted for wedging engagement upon relative movement of said actuating member and pivoted jaws in one direction and formed to then cooperate to move the ledges of the pivoted jaws into lapping relation with the annular work engaging face of the first jaw; and mechanism for effecting relative movement of said actuating member and the set of pivoted jaws and relative movement of the first jaw and the set of pivoted jaws along the axis of the aforesaid annular work engaging face, wherein spring means are applied to the pivoted jaws and operate thereupon, when the actuating member is withdrawn, to bring the ledges upon the pivoted jaws out of lapping relation with the annular work engaging face.

In witness whereof, I hereunto subscribe my name.

RICHARD L. PARISH.